United States Patent [19]

Ban et al.

[11] 3,898,653

[45] Aug. 5, 1975

[54] AUTOMOTIVE RADAR SENSOR

[75] Inventors: Kazuhiro Ban; Jiro Kojima; Teruo Kondoh; Yoshik Masuno; Naoyuki Fukuhara, all of Amagasaki, Japan

[73] Assignee: Mitsubishi Denki Kabushiki Kaisha, Japan

[22] Filed: Feb. 20, 1973

[21] Appl. No.: 333,643

[30] Foreign Application Priority Data

Feb. 22, 1972  Japan.............................. 47-18217
June 21, 1972  Japan.............................. 47-62004
Oct. 28, 1972  Japan.............................. 47-108290

[52] U.S. Cl.................................. 343/7 ED; 343/9
[51] Int. Cl................................................. G01s 9/02
[58] Field of Search ............................. 343/7 ED, 9

[56] References Cited
UNITED STATES PATENTS

| | | | |
|---|---|---|---|
| 2,821,702 | 1/1958 | Russell............................... | 343/9 X |
| 3,142,058 | 7/1964 | Rhodes............................... | 343/9 X |
| 3,750,169 | 7/1973 | Strenglein.......................... | 343/7 ED |
| 3,760,415 | 9/1973 | Holmstrom et al............... | 343/7 ED |

*Primary Examiner*—T. H. Tubbesing
*Attorney, Agent, or Firm*—Robert E. Burns; Emmanuel J. Lobato; Bruce L. Adams

[57] ABSTRACT

A mixer phase detects echo pulses from a target with transmission pulses each having a predetermined frequency and serving as a range gating signal to form a pulse train having a Doppler wave as its envelope. The pulse train is applied to a holding capacitor to provide the Doppler wave. A counter counts the Doppler waves to produce an output in response to its count exceeding a predetermined value. Alternatively after having expanded its pulses by a stray capacitance around the output of the mixer, the pulse train may be demodulated to the Doppler wave by a sample holding circuit controlled with sampling pulses synchronized with the transmission pulses.

9 Claims, 13 Drawing Figures

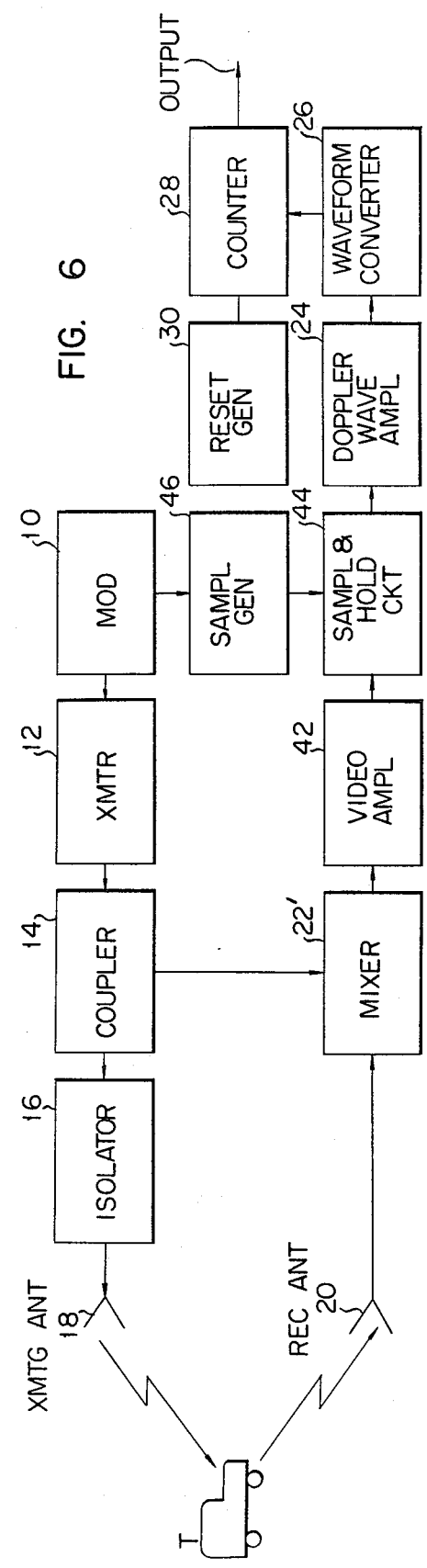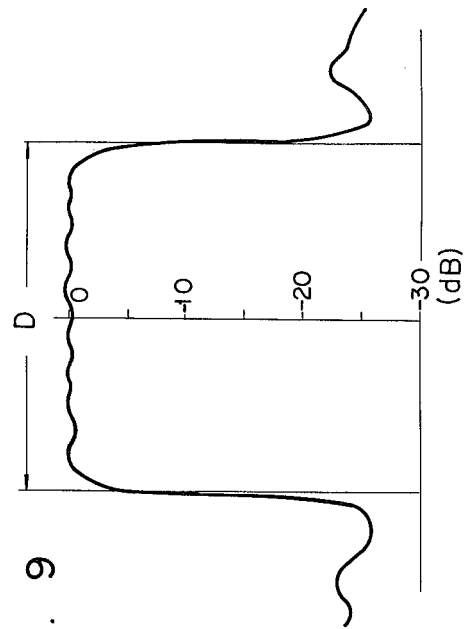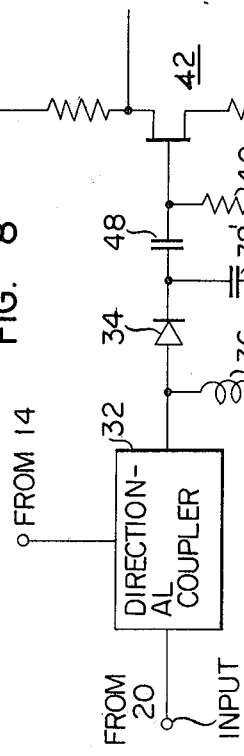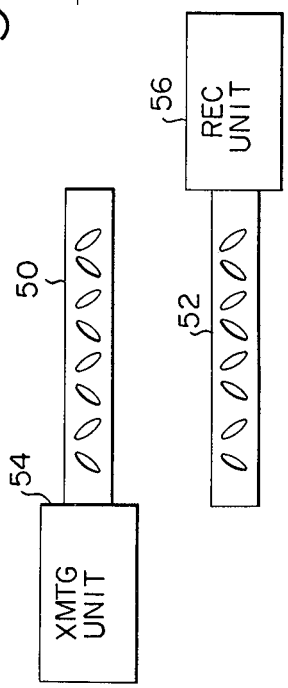

AUTOMOTIVE RADAR SENSOR

BACKGROUND OF THE INVENTION

This invention relates to a radar apparatus for providing simultaneously the range and speed intelligences by a single radar set.

In radar apparatus for use for example as the collision sensor for preventing collisions between relatively moving targets, traveling motor vehicles for protecting the crew therein against collisions, a continuous wave has been previously used so that an echo reflected from the particular target is beat with the transmission signal in a mixer. The resulting signal has an amplitude providing a measure of a range to the target. In that event the amplitude depends upon the size of the target. As a result, a large target though it would be located outside a predetermined distance or the particular coverage could cause the mixer to have as an output an amplitude resembling that resulting from a target located in the coverage. Therefore, when a motor vehicle provided with a radar apparatus as above described is traveling in town or city traffic, the sensor involved may erroneously sense a high building far remote therefrom as being a motor vehicle traveling in the coverage resulting in the unnecessary operation of the associated collision preventing device or crew protecting device. In order to avoid the objection just described, double frequency Doppler radar systems have been developed by the Bendix Corporation etc. and are presently used. Briefly, the double frequency Doppler radar systems comprises means for alternately radiating a pair of signals having different frequencies of $f_1$ and $f_2$ and means for phase detecting a pair of echos resulting from the radiated signals and having Doppler frequencies of $FD_1$ and $FD_2$ to form a phase difference therewith providing a measure of a distance or range to the particular target. Those radar systems have been disadvantageous in that their circuit configurations are complicated.

SUMMARY OF THE INVENTION

Accordingly it is an object of the present invention to provide a new and improved radar apparatus for determining if a target, for example, such as a motor vehicle moving relative thereto has a distance or a range therebetween equal to or less than a predetermined magnitude and a relative speed equal to or greater than a predetermined magnitude, and which system is particularly suitable for use as a collision pre-sensing device such as a collision preventing device or a crew protecting device.

According to one aspect thereof, the present invention accomplishes this object by the provision of a radar apparatus comprising, in combination, a target, transmitter means for transmitting a train of pulses each having a predetermined fixed frequency. Transmitting antenna means are provided for radiating the train of pulses from the transmitter means toward a target. A receiving antenna means picks up one echo pulse reflected from the target due to each of the transmitted pulses impinging thereupon. Mixer means are connected to the receiving antenna, means for applying, as reference pulses, one portion of the pulses from the transmitter means to the mixer means. The mixer means are operative to phase detect the echo pulses received by the receiving antenna means with the reference pulses to form a pulse train of the echo pulses only in the presence of the corresponding reference pulses serving as a range gating signal. The pulse train has a Doppler wave as its envelope. A holding circuit produces the Doppler wave from the pulse train output from the mixer means. Doppler wave amplifier means amplify the Doppler wave from the holding circuit, and a speed gating circuit is responsive to an output frequency from the Doppler wave amplifier in excess of a predetermined magnitude to provide an output.

Preferably the mixer means may include a detection diode and the holding circuit may include a holding capacitor connected to the detection diode.

According to another aspect of the present invention, the holding capacitor may be replaced by a stray capacitance coupled to the output of the mixer means and the next succeeding circuit means to form a pulse-width expander means for stretching the pulses of the pulse train from the mixer means. The stretched pulses are applied to a sample holding circuit to be held in accordance with sampling pulses generated in synchronization with the pulses from the transmitter means thereby to produce the Doppler wave.

According to still another aspect of the present invention, the transmitting and receiving antennas may be preferably waveguide slot antennas disposed in spaced parallel relationship with each other, and a transmitter unit may have the transmitting slot antenna connected at one end thereto while a receive unit has the receiving slot antenna connected at that end remote from the one end of the transmitting slot antenna to the unit.

BRIEF DESCRIPTION OF THE DRAWINGS

The present invention will become more readily apparent from the following detailed description taken in conjunction with the accompanying drawings in which:

FIG. 6 is a block diagram of a modification of the present invention;

FIG. 8 is a circuit diagram of the mixer shown in FIG. 6;

FIG. 9 is a antenna pattern suitable for use with the present invention;

FIG. 10 is a schematic front view of a radar transmitter unit and a radar receiver unit constructed and arranged in accordance with the another aspect of the present invention;

DESCRIPTION OF THE PREFERRED EMBODIMENTS

While the present invention has a variety of applications where a single radar system is required to simultaneously provide a range intelligence and a speed intelligence concerning any target, the same is particularly suitable for use with motor vehicles for predicting possible collision therebetween and will now be described in conjunction with the application thereof to motor vehicles.

Figure 1:
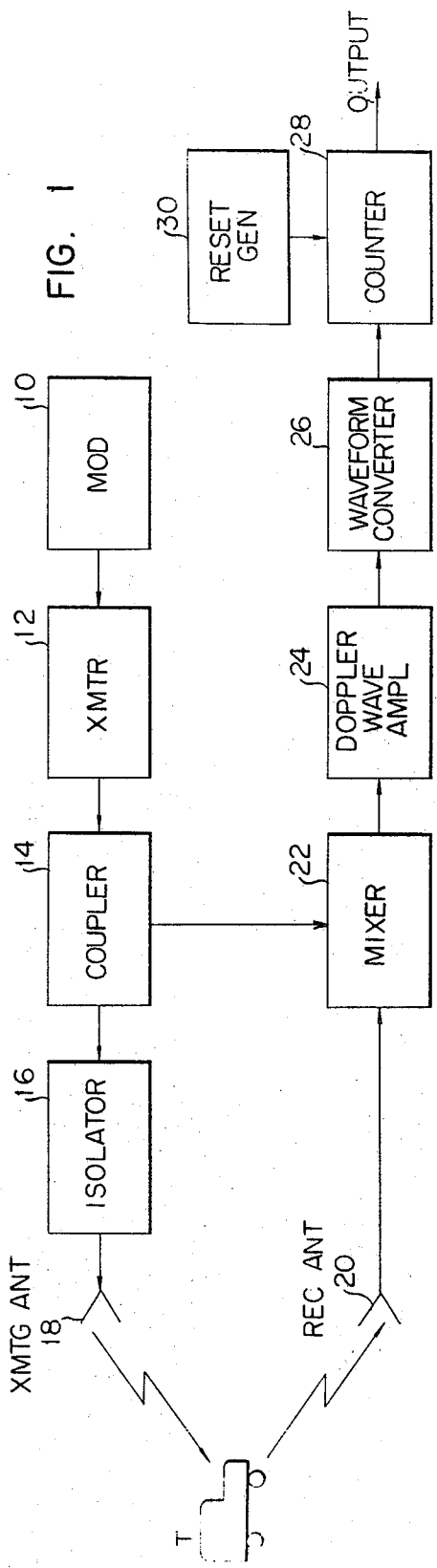
FIG. 1 is a block diagram of a radar system constructed in accordance with the one aspect of the present invention.

Referring now to FIG. 1 of the drawing, there is illustrated a radar apparatus constructed in accordance with one aspect of the present invention. The arrangement illustrated is provided on a motor vehicle (not shown) except for a motor vehicle T as shown on the leftmost portion of FIG. 1 representing a target. The arrangement comprises a radar transmitting unit and a radar receiving unit. The transmitting unit includes a modulator 10, a transmitter 12, a coupler 14 and an isolator 16 connected in series circuit relationship in the named order with the isolator 16 connected to a transmitting radar antenna 18. The receiving unit includes a radar receiving antenna 20, a mixer 22, a Doppler wave amplifier 24, a waveform conversion circuit 26 and a counter circuit 28 connected in series circuit relationship in the named order with the counter circuit 28 controlled by a resetting pulse generator 30.

The operation of the arrangement will now be described with reference to FIG. 2. The modulator 10 produces modulating pulses having a predetermined fixed duration of $\tau_o$ and a predetermined pulse recurrence rate as shown at waveform A in FIG. 2. The modulating pulses are applied to the transmitter 12 to cause it to generate a pulse modulated transmission signal. As shown at waveform B in FIG. 2, the signal is formed of pulses identical in both duration and pulse recurrence rate to the modulating pulses from the modulator 10 and has a predetermined fixed frequency of $f_o$. The pulses from the transmitter 12 are supplied to the coupler 14 and then through the isolator 16 to the transmitting antenna 18. The transmitting antenna 18 radiates transmission pulse toward the target T. As shown in FIG. 1, the coupler 14 also supplies the transmission pulses, as a reference signal, to the mixer 22 of the receiving unit for the purpose as will be apparent hereinafter.

The transmitted pulses radiated from the transmitting antenna 18 impinge on and are reflected from the target T as echo pulses. That portion of each echo pulse from the target T directed to the receiving antenna 20 is picked up by the latter.

It is now assumed that the target T is moving at a speed of $v$ relative to the radar apparatus as does a motor vehicle. Under the assumed condition, the echo pulses picked up by the receiving antenna 20 undergo the Doppler effect and therefore have a frequency deviating from the transmission frequency of $f_o$ by a Doppler frequency $f_d$ expressed by $$f_d = \frac{2vf_o}{C}$$

where $C$ is the velocity of light. That is, the received echo pulses have a frequency of $f_o \pm f_d$ where the symbol "+" indicates the target T is being moved toward the particular radar system and the symbol "−" indicates that it is being moved away from that radar system.

The echo pulses picked up by the receiving antenna 20 are applied to the mixer 22 where they are phase detected with the reference or transmission pulses from the coupler 14 to be converted to a pulse train including pulses amplitude modulated with a component having the Doppler frequency of $f_d$. (See waveform C shown in FIG. 2.) More specifically, if one echo pulse from the target T reaches the mixer 22 in the presence of a corresponding reference or transmission pulse or within a time interval t or a round trip (see FIG. 2C) shorter than the duration $\tau_o$ of the transmission pulse after the transmission of the corresponding transmission pulse from the transmitting antenna 18, the echo pulse is mixed with the reference pulse to form a pulse of the pulse train. On the other hand, if an echo pulse reaches the mixer at the end of a time interval $t'$ longer than the pulse duration $\tau_o$ after the transmission of a corresponding transmission pulse then the echo pulse may be detected by the mixer but the detected pulse does not form one pulse of the pulse train having the Doppler wave because at that time a corresponding reference pulse is absent in the mixer.

Therefore it will be appreciated that an echo pulse from a target located at most a distance $$R = \frac{C\tau_o}{2},$$

where $C$ is the velocity of light, from the radar apparatus can form a pulse of the pulse train having a Doppler wave whereas an echo pulse from a target located beyond that distance does not form such a pulse. In other word, the distance $R = C\tau_o/2$ is a maximum possible range searched by the transmission pulse having its duration of $\tau_o$. Therefore the reference or transmission pulse serves as a range gating signal and the mixer is operated as a range sensor which is a first one of the characteristic features of the present invention.

In the mixing or phase detecting process effected by the mixer 22, the difference between $+f_d$ and $-f_d$ disappears. Practically, the $+f_d$ and $-f_d$ are not required to differentiate from each other because $-f_d$ indicates that the particular target is moving away from the radar apparatus and is discarded for the purpose of the present invention. If desired, any suitable discriminator circuit may be operatively coupled to the mixer 22 to differentiate one from the other of the $+f_d$ and $-f_d$.

Simultaneously with the detection thereof, the pulse train amplitude modulated with the $f_d$ component is held by a holding circuit (which will be described hereinafter) until the next succeeding echo pulse from the target reaches the mixer. This results in a waveform including the Doppler wave as the fundamental component (see waveform D shown in FIG. 2). Therefore the pulse train having the waveform C shown in FIG. 2 is not actually present.

The present invention has a second characteristic feature that, by utilizing an increase in impedance of a detection diode (as will be described hereinafter) disposed in the mixer 22 due to a bias thereto, the echo pulses are directly converted to corresponding Doppler waves by the mixer 22 without the necessity of using a wide-band amplifier for amplifying a signal having a duration of the transmission pulses. More specifically, when a reference pulse is present the detection diode detects a corresponding echo pulse to cause a flow of detected current therethrough. Thus the detection diode has a very low impedance as compared with the absence of the reference pulse. That echo pulse picked up by the antenna 20 during the flow of detected current through the diode can be mixed with the associated reference pulse to provide an output having an amplitude proportional to a corresponding amplitude of the Doppler frequency $f_d$ component. Since the detection diode abruptly increases in impedance simultaneously with the disappearance of the reference pulse, that output continues to have its amplitude held to that of the echo mixed with the reference pulse at the moment the latter pulse has disappeared until the next succeeding echo reaches the mixer (see waveform D shown in FIG. 2).

Figure 3:
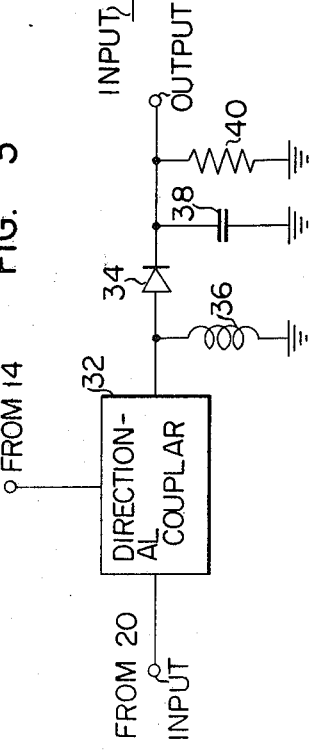
FIG. 3 is a circuit diagram of a holding circuit disposed in the mixer shown in FIG. 1.

In order to realize the second characteristic feature of the present invention as above described, a holding circuit can be operatively coupled to the mixer. FIG. 3 shows such a holding circuit disposed in the mixer 22. As shown in FIG. 3, a directional coupler 32 has applied thereto both a reference pulse from the coupler 14 and the corresponding echo pulse picked up by the receiving antenna 20 and is connected to an anode electrode of a detection diode 34 such as above described. The detection diode 34 is connected at the anode electrode to ground through a high frequency choking coil 36 and at the cathode electrode to ground through a parallel combination of a holding capacitor 38 and a resistor 40. The echo and reference pulses from the directional coupler 32 are applied to the junction of the diode 34 and the choking coil 36 to be detected by the diode 34. A detected current flows through the diode 34 into the holding capacitor 38 where it is accumulated. An electric charge accumulated on the capacitor 38 gradually discharges through the resistor 40 and a load on the output side and also through the reverse resistance of the diode 34. Since a time constant for that discharge is preliminarily selected to be sufficiently large as compared with the pulse recurrence period of the transmission pulses, the charge accumulated on the holding capacitor 38 is held until that reference pulse resulting from the next succeeding transmission pulse is applied to the detection diode 34 to decrease the impedance thereof. Then when an echo pulse due to the same transmission pulse is applied to the diode 34, the process as above described is repeated to update the charge on the capacitor 38 in accordance with the amplitude of the now arrived echo pulse. Thereafter, the updated charge is held on the capacitor 38 until the succeeding reference pulse is applied to the diode. Therefore the mixer 22 generates an output as shown at waveform D in FIG. 2.

Figure 2:
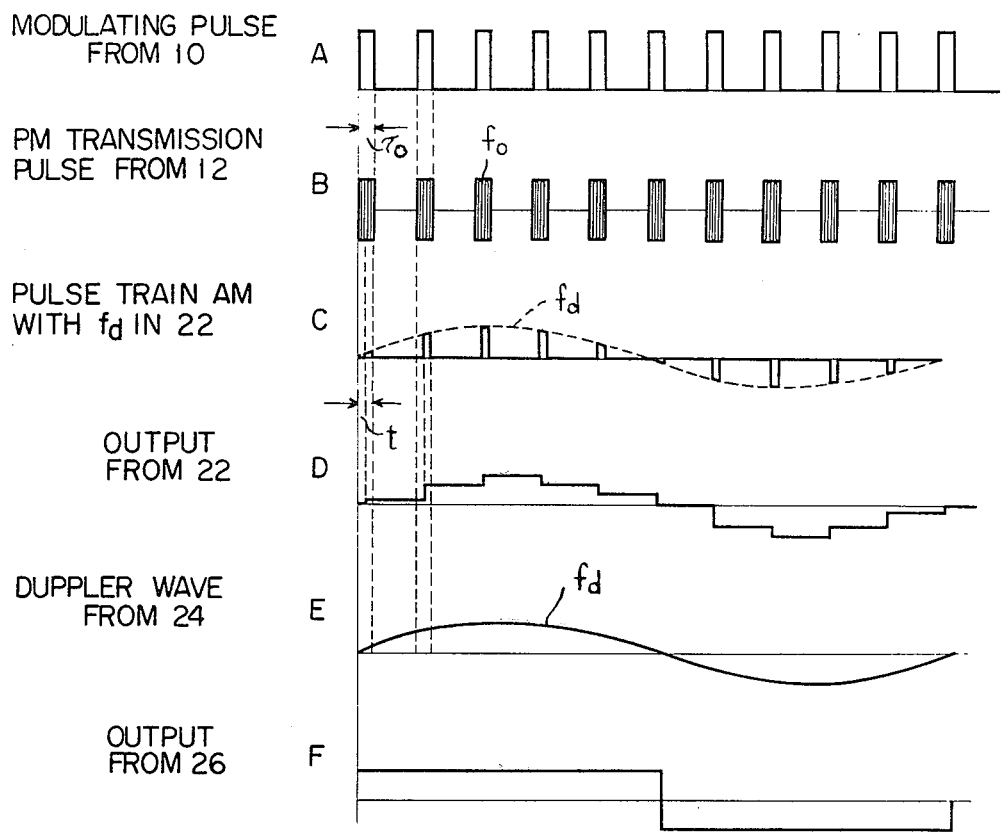
FIG. 2 is a graph illustrating waveforms developed at various points in the arrangement shown in FIG. 1.

The output from the mixer 22 is directly supplied to the Doppler wave amplifier 24 to provide an amplified Doppler wave as shown at waveform E in FIG. 2. Then the output waveform E from the amplifier 24 is applied to the waveform converter 26 where it is converted to a waveform including positive half cycles alternating with negative half cycles with the amplitudes of both half cycles substantially equal to each other as shown in waveform F of FIG. 2.

The waveform F from the waveform converter 26 can readily be subject to any digital processing and has the following characteristic features:

1. Since the Doppler wave amplifier 24 is operative to amplify the Doppler wave alone, the waveform F bears only on an echo from a moving target but not on an echo from a stationary target; and 2. Since the reference pulse applied to the mixer 22 performs the operation of limiting or gating the range, the waveform F is caused only from a Doppler wave due to a relatively moving target positioned within that range from the radar apparatus as predetermined by the duration of the reference pulses.

The output waveform F from the waveform converter 26 is applied to a speed gate circuit formed of the counter and reset generator 28 and 30 respectively. The speed gate circuit is operative to sense a speed of a moving target in excess of a predetermined magnitude through its digital process.

Figure 4:
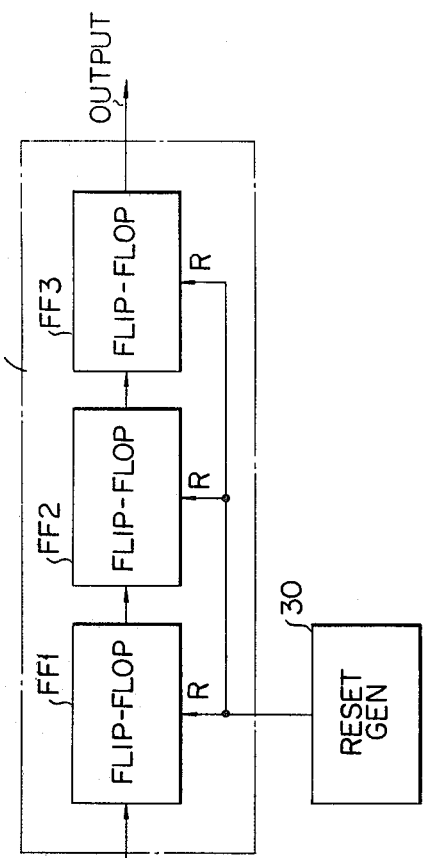
FIG. 4 is a block diagram of the resetting pulse generator and counter circuit shown in FIG. 1.

In FIG. 4 the speed gate circuit is shown as including the counter circuit 28 formed, for example of three FLIP-FLOP's FF1, FF2 and FF3 serially interconnected and the reset generator 30 connected to all of the FLIP-FLOP's at the resetting terminals R.

Figure 5:
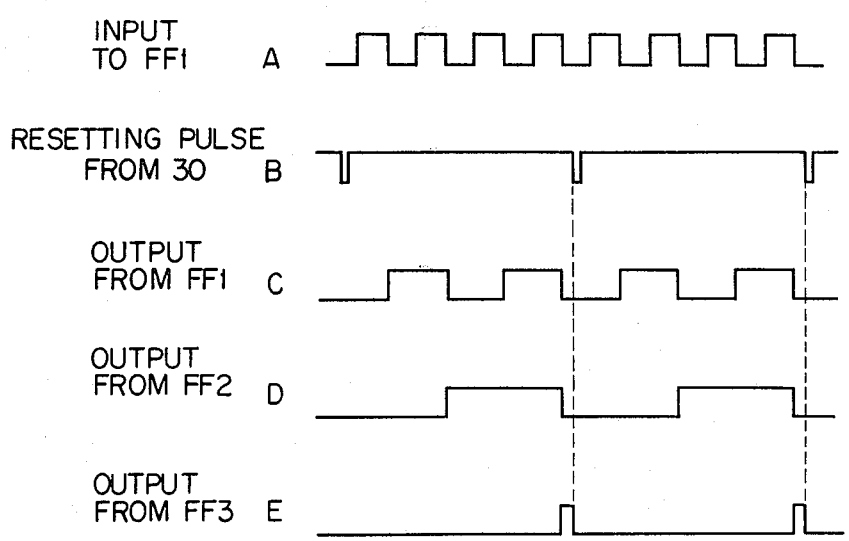
FIG. 5 is a graph illustrating waveforms developed at various points in the arrangement shown in FIG. 4.

In operation, the output from the waveform converter 26 as shown at waveform A in FIG. 5 is applied to the first FLIP-FLOP FF1 of the counter circuit 28. The waveform F as shown in FIG. 2 corresponds to the waveform A shown in FIG. 5 as including several cycles of the Doppler wave. The reset generator 30 generates resetting pulses having a predetermined fixed pulse recurrence rate (see waveform B shown in FIG. 5) and applied in parallel to the FLIP-FLOP's FF1, FF2 and FF3. The counter circuit 28 is designed and constructed such that when it counts a predetermined fixed number $n$ or more of the Doppler pulses within a time interval between each pair of adjacent resetting pulses, the counter circuit 28 provides an output. In the example illustrated, the $n$ has a value of 4. Each time the resetting pulse (waveform B, FIG. 5) from the reset generator 30 is applied to all the FLIP-FLOP's FF1, FF2 and FF3 to reset or clear the counter circuit 28, the latter begins to count the Doppler pulses to produce from the FLIP-FLOP's FF1 and FF2 binary outputs as shown at waveforms C and D in FIG. 5. When a fourth Doppler pulse is applied to the counter circuit 28, the FLIP-FLOP FF3 responds to the trailing edge of the Doppler pulse to be set thereby to produce an output as shown at waveform E in FIG. 5 indicating a count of four on the counter circuit 28. Then the next succeeding resetting pulse from the generator 30 is applied to the counter circuit 28 to reset the third FLIP-FLOP FF3 while maintaining the first and second FLIP-FLOP's FF1 and FF2 reset after which the process as above described is repeated.

If it is desired to count more than four Doppler pulses then the number of the FLIP-FLOP's may be correspondingly increased.

Where the counter circuit 28 is arranged to count the $n$ Doppler pulses within the pulse recurrence period of the resetting pulses, the same can count the Doppler pulses with a counting error of $1/n$. Therefore both the counting error and the number of resets of the Doppler waves in a predetermined time interval applied to the counter circuit 28 determines the $n$ and therefore the pulse recurrence period of the resetting pulses. That is the resetting pulses have a recurrence period or a time interval between each pair of the adjacent two expressed by $n/f_d$ in seconds where $f_d$ is a Doppler frequency with a counting error of $1/n$. It is noted that the output from the counter circuit 28 has a pulse width or a duration randomly variable because the input pulses to the counter circuit 28 are not synchronized with the resetting pulses.

From the foregoing it will be appreciated that the counter circuit 28 provides an output including both range intelligence and a relative speed intelligence indicating that the associated target is within a zone of ranges as predetermined by the arrangement of FIG. 1 or in a coverage thereof and moving toward the arrangement at a relative speed equal to or higher than a predetermined fixed magnitude. Thus there is a fear that a collision may possibly to occur.

The output from the counter 28 is supplied to the associated collision preventing or crew protecting device (not shown) to perform a suitable operation such as an alarm.

The radar apparatus as above described is of a pulse Doppler radar system. Therefore, with the radar apparatus provided on a motor vehicle or the like, it is required to avoid interferences of that radar apparatus with radar apparatus on other motor vehicles or the like. To this end, radar antennas may have different polarization planes.

In the arrangement of FIG. 1, reference pulses are formed of one portion of corresponding transmission pulse and used as a range gating signal by detecting a corresponding Doppler wave only during the presence of corresonding reference pulses. Therefore the arrangement can readily provide not only relative speed intelligence but also range intelligence concerning the particular target so that it is extremely suitable for use as a radar apparatus for predicting possible collisions between motor vehicles.

Also the mixer includes a detection diode for detecting a pulse train corresponding to the Doppler wave. A change in impedance of the detection diode is utilized to hold the output detected by the mixer. This makes it possible to detect the Doppler wave with a simple circuit configuration and without the necessity of using a wideband amplifier.

The arrangement of FIG. 1, however, has encountered problems of requiring the holding circuit included in the mixer and having the holding capacitor to have a time constant for discharge sufficiently large as compared with the pulse recurrence period of the transmission pulses and also causing the holding circuit to be comparatively high in loss by itself. According to another aspect thereof, the present invention contemplates to solve those problems by the provision of an arrangement such as shown in FIG. 6.

In FIG. 6 wherein like reference numerals designate the components identical or similar to those shown in FIG. 1, the arrangement illustrated comprises the same transmitting unit as the arrangement of FIG. 1 and a receiving unit substantially identical to that shown in FIG. 1 except for a video amplifier 42 and a sampling and holding circuit 44 connected in series circuit relationship between the mixer 22′ somewhat different in construction from the mixer 22 shown in FIG. 3 and the Doppler wave amplifier 24. Then the circuit 44 is controlled by a sampling generator 46.

Therefore, in the arrangement of FIG. 6, the components 10 through 26 are identical in operation to the corresponding components shown in FIG. 1 except for the operation performed by the mixer 22′. Thus waveforms A, B and C shown in FIG. 7 correspond to waveforms A, B and C shown in FIG. 2 respectively.

The mixer 22′ has preferably a circuit configuration as shown in FIG. 8 wherein like reference numerals designate the components identical to those illustrated in FIG. 3. The arrangement is different from that shown in FIG. 3 only in that a stray capacitance 38′ coupled to the output and input respectively of the mixer 22′ and the video amplifier 42 or its equivalent is substituted for the holding capacitor 38 shown in FIG. 3 and that the detection diode 34 is connected at the cathode electrode to the video amplifier 42 through a coupling capacitor 48. The video amplifier 42 is shown in FIG. 8 as including a field effect transistor whose gate electrode is connected to the coupling capacitor 48 and also to ground through a resistor 40.

The arrangement is substantially similar in operation to that illustrated in FIG. 3 excepting that a resistance provided by the conducting diode 34 cooperates with the stray capacitance 38′ to impart the integration effect to the output pulse from the mixer 22′ to decrease the rise time of the output pulse.

As in the arrangement of FIG. 3, the stray capacitance 38′ is responsive to the disappearance of a reference pulse to cause an electric charge thereon to discharge in the similar manner as above described in conjunction with FIG. 3 but with a shorter time constant. Therefore the output pulse from the mixer 22′ is stretched in duration.

Figure 7:
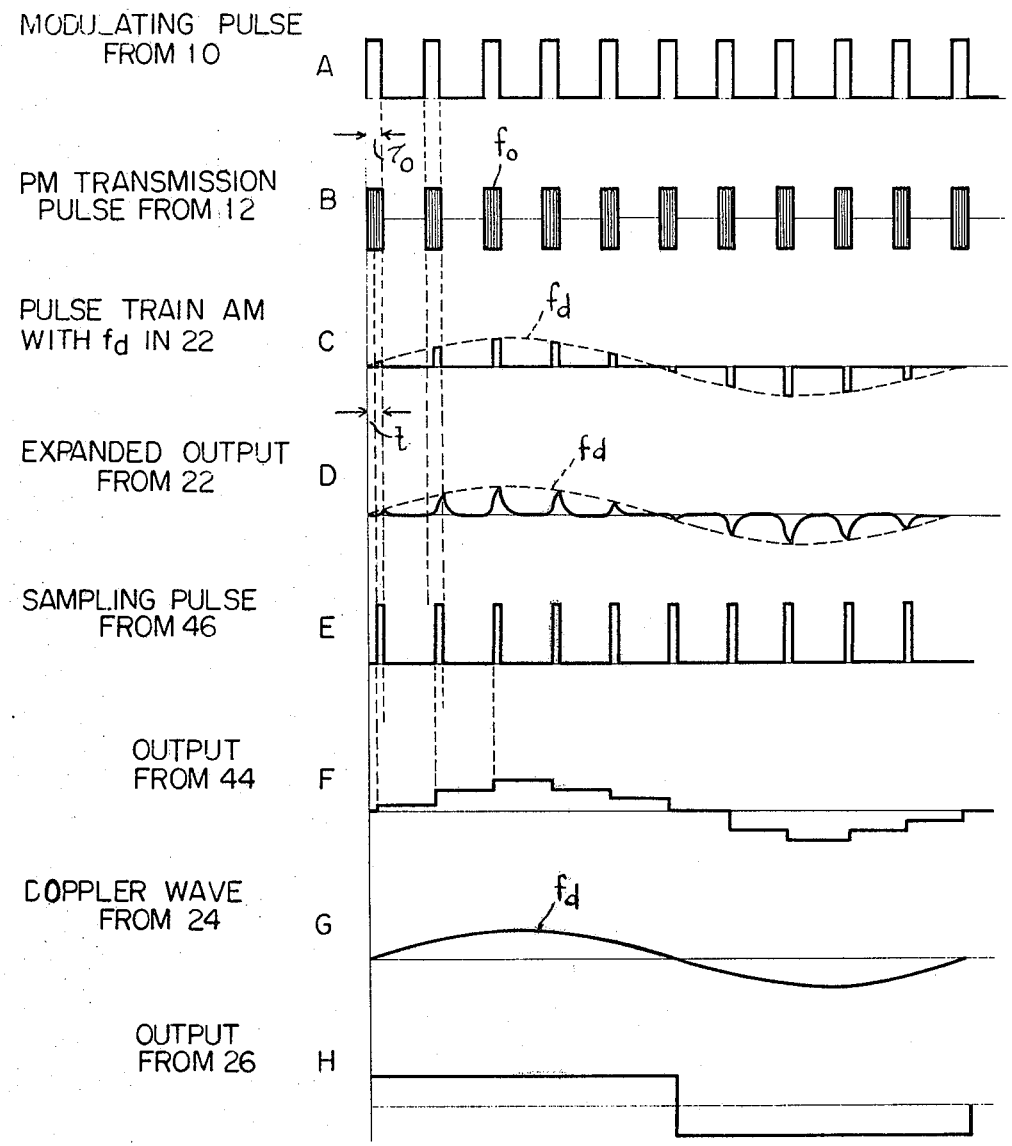
FIG. 7 is a graph illustrating waveforms developed at various points in the arrangement shown in FIG. 6.

The stretched pulse (see waveform D shown in FIG. 7) output from the mixer 22′ is amplified by the video amplifier 42 and then applied to the sampling and holding circuit 44. At that time, the sampling and holding circuit 44 has applied thereto a sampling pulse (which is shown at waveform E in FIG. 7) generated by the sampling pulse generator 46 triggered with the corresponding modulating pulse from the modulator 10. The sampling and holding circuit 44 is operative to sample the stretched pulse from the mixer 22′ by means of the sampling pulse and hold it until the next succeeding sampled value is obtained (see waveform F shown in FIG. 7). Thus the required Doppler wave is demodulated. The waveform F from the sample holding circuit 44 is processed in the same manner as above described in conjunction with FIGS. 1 and 2. In FIG. 7, waveforms G and H correspond to the waveforms E and F shown in FIG. 2 respectively.

Radar systems are generally used to search for targets located in an area remote from the antenna thereof. This area is theoretically defined as what is at and beyond such a distance that the electric wave radiated from the particular radar antenna has a wave front capable of being regarded as a plane rather than a spherical surface. Assuming that R represents a distance in a coverage of the particular radar system measured from the antenna thereof, D is the antenna aperture and λ represents a wavelength of an electromagnetic wave used with the radar system, the radar system is effective at a distance expressed by $$R \geq 2 \frac{D^2}{\lambda}.$$

Therefore the performance of radar antennas can be specified on the basis of the concepts such as the gain, the beam width etc.

On the other hand, if radar systems are attempted to be used to prevent collisions between motor vehicles as in the present invention, then the radar systems are required to have a coverage only extending up to several meters from the front of the associated motor vehicle. Under these circumstances, the performance of their antennas can not be specified on the basis of the concepts such as the gain, the beam width etc. and what is important is the directional pattern of the antenna in the proximity thereof.

FIG. 9 shows typically a vertical antenna pattern in the proximity of a radar antenna. As shown in FIG. 9, the antenna establishes an electromagnetic field in the proximity thereof high only throughout an aperture width D thereof and sharply decreased outside of the aperture width. It is highly desirable to use an antenna having a coverage in the Fresnel region of the antenna pattern such as shown in FIG. 9 with any radar system for preventing collision between motor vehicles. This results from a decrease in the probability of erroneously activating the alarm as a result of the location of a target having its dimension greater than the width and/or height of the motor vehicle due to the spreading of the particular electromagnetic field. On the other hand, a guarded range in front of the motor vehicle is approximately equal to a width of an antenna aperture involved or a length of a waveguide type slot antenna used. Under these circumstances, it is assumed that, for example, a pulsed electromagnetic wave radiated from one end of a long section of a waveguide impinges upon a target and an echo reflected from the target reaches the associated receiving unit. Then, the received pulse increases in duration and lags in phase angle due to its propagation time within the section of the waveguide. Where the transmitting pulses are long in duration or where a search range is large, a propagation time within the short section of waveguide is out of the question. However it is desired to search for a very close area as in radar systems for preventing collisions between motor vehicles or if one uses pulses having a short duration in the order of one nanosecond then the propagation time within such a section of waveguide causes an increase in the duration of the received pulses leading to the impossibility of neglecting the resulting phase lag.

According to still another aspect thereof, the present invention further contemplates to eliminate the disadvantage as above described by the provision of a transmitting and a receiving antenna system arranged as shown in FIG. 10 to correct the total of propagation times of pulses within the transmitting and receiving antennas. As shown in FIG. 10, transmitting and receiving slot antennas of waveguide type 50 and 52 are disposed in spaced, parallel relationship with each other. Then a transmitting unit 54 such as shown in FIG. 1 or 6 is electrically attached or connected to the transmitting antenna 50 at one end, in this case, the lefthand end as viewed in FIG. 10 while a receiving unit 56 such as shown in FIG. 1 or 6 is electrically attached or connected to the receiving antenna 52 at that end near to the other end of the transmitting antenna 50 or at the righthand end. This measure causes a delay time during the transmission of the pulses to cancel out a delay time during the reception of the pulses. Thus the disadvantage above described is eliminated.

Figure 11:
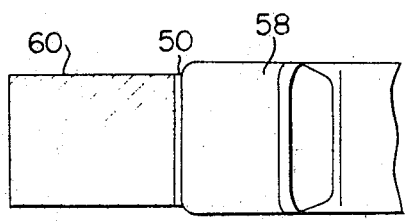
FIG. 11 is a fragmentary plan view of a motor vehicle illustrating a horizontal coverage in front thereof.

As shown in FIG. 11, the arrangement of FIG. 9 is attached to the front of a motor vehicle 58 with the transmitting and receiving antennas horizontally disposed as seen from the antenna 50 illustrated in FIG. 11. This ensures that a well defined coverage is horizontally established ahead and in close proximity of the vehicle 58 as shown by a hatched rectangle 60 configuous to the front edge of the antenna 50 in FIG. 11.

Figure 12:
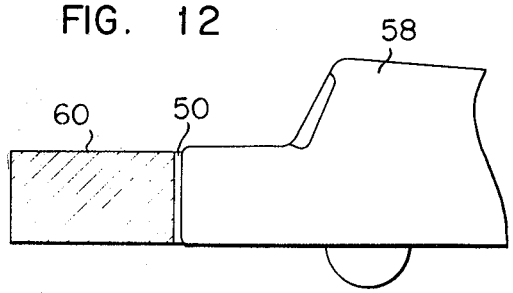
FIG. 12 is a fragmentary side elevational view of the motor vehicle illustrating a vertical coverage in front thereof.

FIG. 12 shows the transmitting antenna 50 and therefore the receiving antenna (not shown) vertically attached to the front of the motor vehicle 58 to establish a well defined vertical coverage as shown by a hatched rectangle 60.

Figure 13:
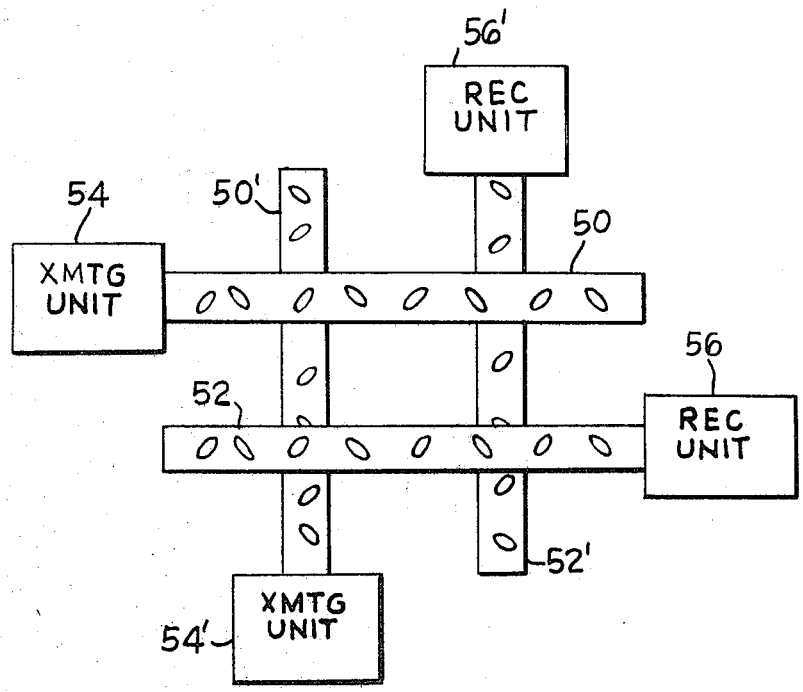
FIG. 13 is a schematic front view of a vertical and a horizontal antenna orthogonally disposed in the front of the motor vehicle not shown and the associated transmitter and receiver units.

In FIG. 13 where in like reference numerals designate the components identical to those shown in FIGS. 11 and 12, a pair of transmitting and receiving antenna such as shown in FIG. 10 and another pair of similar antenna are shown as being vertically and horizontally attached to the front of a motor vehicle such as shown in FIGS. 11 and 12 to cause both pairs to be orthogonal to each other. This measure ensures the formation of a three dimensional coverage well defined is formed in the form of a rectangular hexahedron. In that event, the slot antennas may have their slots formed into horns in order that the vertical and horizontal antennas have sufficiently narrow beam widths in the horizontal and vertical directions respectively. Alternatively, array antennas may be used. Also it will readily be understood that a maximum possible range from the front of the motor vehicle, that is to say, a maximum longitudinal length of the coverage can be controlled by the reference pulse determining the range gating with respect to the position of the motor vehicle.

As an example, the present radar apparatus can be effective over a distance of 1.5 meters with the modulating pulses having a pulse recurrence frequency of 250 kilohertz and a duration of 17 nanoseconds. In that event, assume that the transmission pulses have a frequency of 10 gigahertz, that $n$ has a value of 4 and that the resetting pulses for the counter circuit 28 have a pulse recurrence period of 6.75 milliseconds. The counter circuit 28 provides an output indicating that the relative velocity is at least in the order of 32 kilometer per hour corresponding to a Doppler frequency of 592 hertz. However it is to be understood that the present invention is not restricted to the figures just specified and that the parameters for the modulating, transmission and resetting pulses and $n$ may have any desired values for the particular application.

While the present invention has been illustrated and described in conjunction with a few preferred embodiments thereof it is to be understood that numerous changes and modifications may be resorted to without departing from the spirit and scope of the invention.

What we claim is:

1. A radar apparatus comprising, in combination, transmitter means for transmitting a train of transmission pulses each having a predetermined fixed frequency, transmitting antenna means for radiating the train of transmission pulses toward a target, receiving antenna means for picking up one echo pulse reflected from said target due to each of the transmission pulses hitting thereon, mixer means connected to said receiving antenna means, means for applying one portion of each transmission pulse from said transmitter means, as a reference pulse to said mixer means, said mixer means being operative to phase detect the echo pulses picked up by said receiving antenna means with the reference pulses to form a pulse train of the echo pulses only in the presence of the corresponding reference pulses serving as a range gating signal, said pulse train having a Doppler wave as its envelope, a holding circuit for producing the Doppler wave from the pulse train outputted by said mixer means, Doppler wave amplifier means for amplifying the Doppler wave from said holding circuit, and a speed gating circuit responsive to a frequency output from said Doppler wave amplifier means in excess of a predetermined fixed magnitude to provide an output.

2. A radar apparatus as claimed in claim 1, wherein said mixer means includes a detection diode and wherein said holding circuit includes a holding capacitor for holding the pulses of the pulse train from said mixer means and directly supplying the held pulses to said Doppler wave amplifier means.

3. A radar apparatus as claimed in claim 1, wherein said transmitting and receiving antenna means are disposed in spaced parallel relationship and wherein a transmitting unit is connected to said transmitting antenna means at one end and a receiving unit is connected to said receiving antenna means at that end remote from the one end of said transmitting antenna means.

4. A radar apparatus as claimed in claim 3, wherein said transmitting unit is integrally connected to said transmitting antenna means and said receiving unit is integrally connected to said receiving antenna means.

5. A radar apparatus comprising a pair of radar apparatus as defined in claim 3 disposed to render said transmitting and receiving antenna means of said pair of radar apparatus orthogonal to said transmitting and receiving antennas of the other radar apparatus to form a three dimensional coverage.

6. A radar apparatus comprising, in combination, transmitter means for transmitting a train of transmission pulses each having a predetermined fixed frequency, transmitting antenna means for radiating the train of transmission pulses toward a target, receiving antenna means for picking up one echo pulse reflected from said target due to each of transmitted pulses hitting thereupon, mixer means connected to said receiving antenna means, means for applying, one portion of each transmission pulse from said transmitter means, as a reference pulse to said mixer means, said mixer means being operative to phase detect the echo pulses picked up by said receiving antenna means with the reference pulses to form a pulse train of the echo pulses only in the presence of the corresponding reference pulses serving as a range gating signal, said pulse train having a Doppler wave as its envelope, a video amplifier, a pulse width stretching means connected between said mixer means and said video amplifier to stretch the pulses of the pulse train from said mixer means by means of a representation of stray capacitances coupled to the output and input respectively of said mixer and video amplifier means and to supply the stretched pulses to said video amplifier means, sample generator means for generating sampling pulses in synchronization with the transmission pulses from said transmitter means, a sampling and holding circuit connected to said sample generator means to hold the pulse train amplified by said video amplifier in accordance with the corresponding sampling pulses thereby to produce a Doppler wave, Doppler wave amplifier means for amplifying the Doppler wave from said sample holding circuit, and a speed gating circuit responsive to a frequency outputted from said Doppler wave amplifier means in excess of a predetermined fixed magnitude to provide an output.

7. A radar apparatus as claimed in claim 6, wherein said transmitting and receiving antenna means are disposed in spaced parallel relationship and wherein a transmitting unit is connected to said transmitting antenna means and a receiving unit is connected to said receiving antenna means at that end remote from the one end of said transmitting antenna means.

8. A radar apparatus as claimed in claim 7, wherein said transmitting unit is integrally connected to said transmitting antenna means and said receiving unit is integrally connected to said receiving antenna means.

9. A radar apparatus comprising a pair of radar apparatus as defined in claim 7 disposed to render said transmitting and receiving antenna means of one of said pair of radar apparatus orthogonal to said transmitting and receiving antenna means to form a three dimensional coverage.

* * * * *